(12) United States Patent
Choi (10) Patent No.: US 9,150,143 B2
(45) Date of Patent: Oct. 6, 2015

(54) HEADLAMP CONTROL SYSTEM AND METHOD FOR A VEHICLE

(71) Applicant: Hyundai Motor Company, Seoul (KR)

(72) Inventor: Seongjun Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 140 days.

(21) Appl. No.: 13/710,082

(22) Filed: Dec. 10, 2012

(65) Prior Publication Data
US 2014/0091709 A1   Apr. 3, 2014

(30) Foreign Application Priority Data

Sep. 28, 2012  (KR) .......................... 10-2012-0109083

(51) Int. Cl.
| | | |
|---|---|---|
| *B60Q 1/02* | (2006.01) | |
| *B60Q 1/04* | (2006.01) | |
| *B60Q 1/08* | (2006.01) | |
| *B60Q 1/24* | (2006.01) | |

(52) U.S. Cl.
CPC .. *B60Q 1/04* (2013.01); *B60Q 1/08* (2013.01); *B60Q 1/24* (2013.01); *B60Q 2400/40* (2013.01); *B60Q 2900/30* (2013.01)

(58) Field of Classification Search
None
See application file for complete search history.

(56) References Cited

U.S. PATENT DOCUMENTS

| | | | |
|---|---|---|---|
| 2006/0046684 A1* | 3/2006 | Kameyama | 455/345 |
| 2007/0030136 A1* | 2/2007 | Teshima et al. | 340/458 |
| 2009/0066255 A1* | 3/2009 | Nakayama et al. | 315/77 |
| 2011/0115375 A1* | 5/2011 | Shiratsuchi et al. | 315/77 |

FOREIGN PATENT DOCUMENTS

| | | | |
|---|---|---|---|
| JP | 2006-069296 A | | 3/2006 |
| JP | 2008-149784 A | | 7/2008 |
| JP | 2008149784 A | * | 7/2008 |
| KR | 20-0397864 Y1 | | 9/2005 |
| KR | 10-2008-0111931 A | | 12/2008 |
| KR | 10-2012-0028661 | | 3/2012 |

\* cited by examiner

*Primary Examiner* — Anh Tran
(74) *Attorney, Agent, or Firm* — Mintz Levin Cohn Ferris Glovsky and Popeo, P.C.; Peter F. Corless (57) ABSTRACT

Disclosed is a headlamp control system for a vehicle capable of illuminating a location of a user by controlling lighting of the vehicle's headlamps and controlling driving of the headlamps through actuators based on communication with a radio signal transmitter possessed by the user. The headlamp control system can include: headlamps; one or more actuators installed in the headlamps for driving the headlamps upward, downward, left, and right; a plurality of radio signal receivers at two or more locations of the vehicle for receiving a radio signal; a portable radio signal transmitter for transmitting a radio signal to the radio signal receiver; and a controller for determining a position of the radio signal transmitter based on the radio signal and controlling the headlamp and the actuator to irradiated the position of the radio signal transmitter.

11 Claims, 7 Drawing Sheets

HEADLAMP CONTROL SYSTEM AND METHOD FOR A VEHICLE

CROSS-REFERENCE TO RELATED APPLICATION

This application claims priority to and the benefit of Korean Patent Application No. 10-2012-0109083 filed in the Korean Intellectual Property Office on Sep. 28, 2012, the entire contents of which are incorporated herein by reference.

BACKGROUND OF THE INVENTION (a) Field of the Invention

The present invention relates to a headlamp control system and method for a vehicle, and more particularly, to a headlamp control system and method for a vehicle capable of illuminating a place where a user (driver) is located. In particular, the present system and method illuminate a location of user through a radio signal transmitter that is in connection with actuators which control the lighting of the vehicle's headlamps and controlling the driving (positioning) of the headlamps.

(b) Description of the Related Art

In general, a vehicle includes a lighting system that enables the driver to see objects and road conditions in a driving direction while driving at nighttime and in low lighting conditions, and that notifies other drivers on a road of a driving state of the vehicle.

An adaptive front lighting system (AFLS) has been recently introduced to improve front view recognition for the driver and for oncoming drivers. The adaptive front lighting system is capable of selectively changing widths and lengths of beams of headlamps according to a driving condition of a vehicle, road conditions, environmental conditions, and the like. The adaptive front lighting system further provides uniform emission of the headlamp beams in a front direction of the vehicle.

Figure 1:
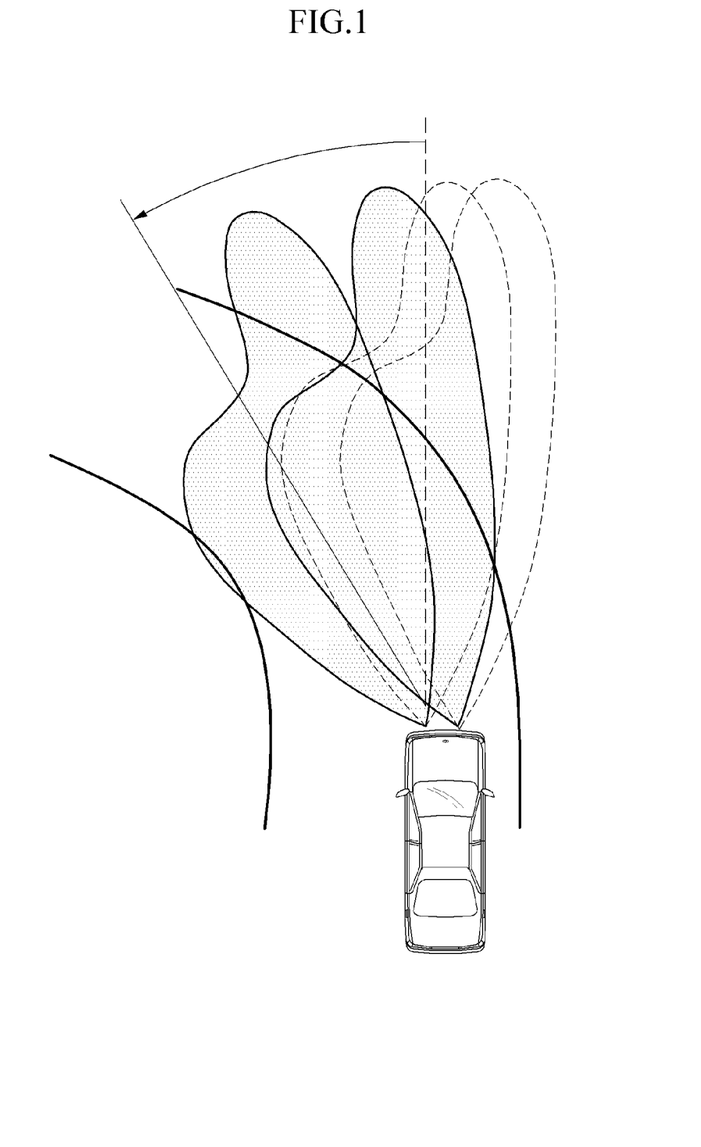
FIG. 1 is a conceptual diagram illustrating an example of use of a conventional adaptive front lighting system for a vehicle.

As such, the adaptive front lighting system enables a driver to more rapidly and accurately recognize obstacles or other problems along the driver's path, for example, by changing a beam pattern (an irradiation direction of the to beam) based on road conditions, as well as a vehicle movement direction when the vehicle rotates as illustrated in FIG. 1.

The adaptive front lighting system senses a steering angle of a steering wheel of the vehicle, a speed of the vehicle, and other driving conditions of the vehicle through a sensor. Based on the information sensed, an actuator is driven to control deflection of irradiation directions of the headlamps upwards, downwards, left, and/or right.

Thus, the adaptive front lighting system includes an actuator for controlling driving of the irradiation directions of the headlamps upward, downward, left, and right.

An adaptive front lighting system is described in Korean Patent Application Laid-Open No. 10-2012-0028661, U.S. Patent Application Publication No. US20110121733, and the like.

However, the adaptive headlamps of such adaptive front lighting systems can only be controlled by the actuator while the vehicle is running.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a headlamp control system and method for a vehicle that illuminates a place where a user (driver) is located through actuators installed in headlamps which control the driving (positioning) of the headlamps. In particular, the present system and method is configured to illuminate a location of a user outside of the vehicle through actuators for a predetermined time when a user approaches the vehicle in order to get into the vehicle or after the user gets out of the vehicle.

According to one aspect, the present invention provides a control system for controlling headlamps of a vehicle, including: one or more actuators installed in the headlamps of the vehicle to drive the headlamps upward, downward, left, and right; a plurality of radio signal receivers installed at two or more places of the vehicle to receive a radio signal; a portable radio signal transmitter configured to transmit a radio signal that is received in the radio signal receiver; and a controller configured to determine a position of the radio signal transmitter based on the radio signal received by the radio signal receiver, and to control the headlamps and the actuator so that light of the headlamps is irradiated to the position of the radio signal transmitter.

According to various embodiments, the controller includes an illuminance detector configured to detect illuminance of a neighboring area. If the detected illuminance of the neighboring area is equal to or larger than predetermined illuminance, then the controller may be configured such that the signal of the radio signal receiver is not processed. In other words, if it is determined that the illuminance around a user is sufficient, then the controller may be configured such that light of the headlamps is not irradiated According to various embodiments, a plurality of radio signal receivers are installed spaced apart from each other by a predetermined distance. In particular, the radio signal receivers may be spaced so that intensities of the received signals are different. A difference between the intensities may be equal to or larger than a set amount when distances between the radio signal transmitter and the plurality of radio signal receivers are different.

According to various embodiments, the plurality of radio signal receivers include a left radio signal receiver and a right radio signal receiver installed at a left side and a right side of the vehicle, respectively, and a central radio signal receiver installed at a central position of the vehicle. In particular, the left, right and central radio signal receivers may be installed so as to have an isosceles triangular structure.

According to various embodiments, the central radio signal receiver is positioned at a rear side of the vehicle with respect to the left and right radio signal receivers.

According to various embodiments, the radio signal transmitter is formed as a smart key.

According to various embodiments, the controller includes: a microprocessor configured to receive a signal from the radio signal receiver to control a general operation of the controller; relay drivers and relays configured to apply power of a battery of the vehicle to the headlamps under control of the microprocessor; and actuator drivers configured to control driving of the actuators under control of the microprocessor.

According to various embodiments, the controller is configured to control of the vehicle, including authentication of a driver and wireless starting of the vehicle, through wireless communication.

According to various embodiments, the controller is combined with a body control module (BCM) configured for performing control of body electronic equipment including, for example, control of an indication lamp of the vehicle.

According to various embodiments, the controller determines that the radio signal transmitter is far away from the vehicle when a sum of intensities of the radio signals received in the plurality of radio signal receivers is gradually decreased. The controller may further determine that the radio signal transmitter becomes close to the vehicle when the sum of intensities of the radio signals received in the plurality of radio signal receivers gradually increases.

As described above, according to an embodiment of the present invention, one or more actuators (which may be similar to those in adaptive headlamps) are installed in the headlamps, and the driving of the headlamps is controlled while the user is outside of the vehicle. In particular, the actuators may control the driving of the headlamps for a predetermined time when a user (driver) approaches the vehicle in order to get into the vehicle and after the user (driver) gets out of the vehicle so as to illuminate a place where the user is located. The present system and method, thus, improves convenience with which the vehicle is used.

According to an exemplary embodiments of the present invention, when a user (driver) approaches the vehicle in order to get into the vehicle or the user's (driver) distance from the vehicle increases after getting out of the vehicle at night or in low lighting conditions, the lights of the headlamps illuminates the user for a set time, thereby improving safety when the vehicle is used at night or in low lighting conditions.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, the term "user" refers to a driver of a vehicle.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Throughout the specification, the letters L, R, and C written together with reference numbers mean left, right, and center, respectively, unless specifically otherwise described.

Figure 2:
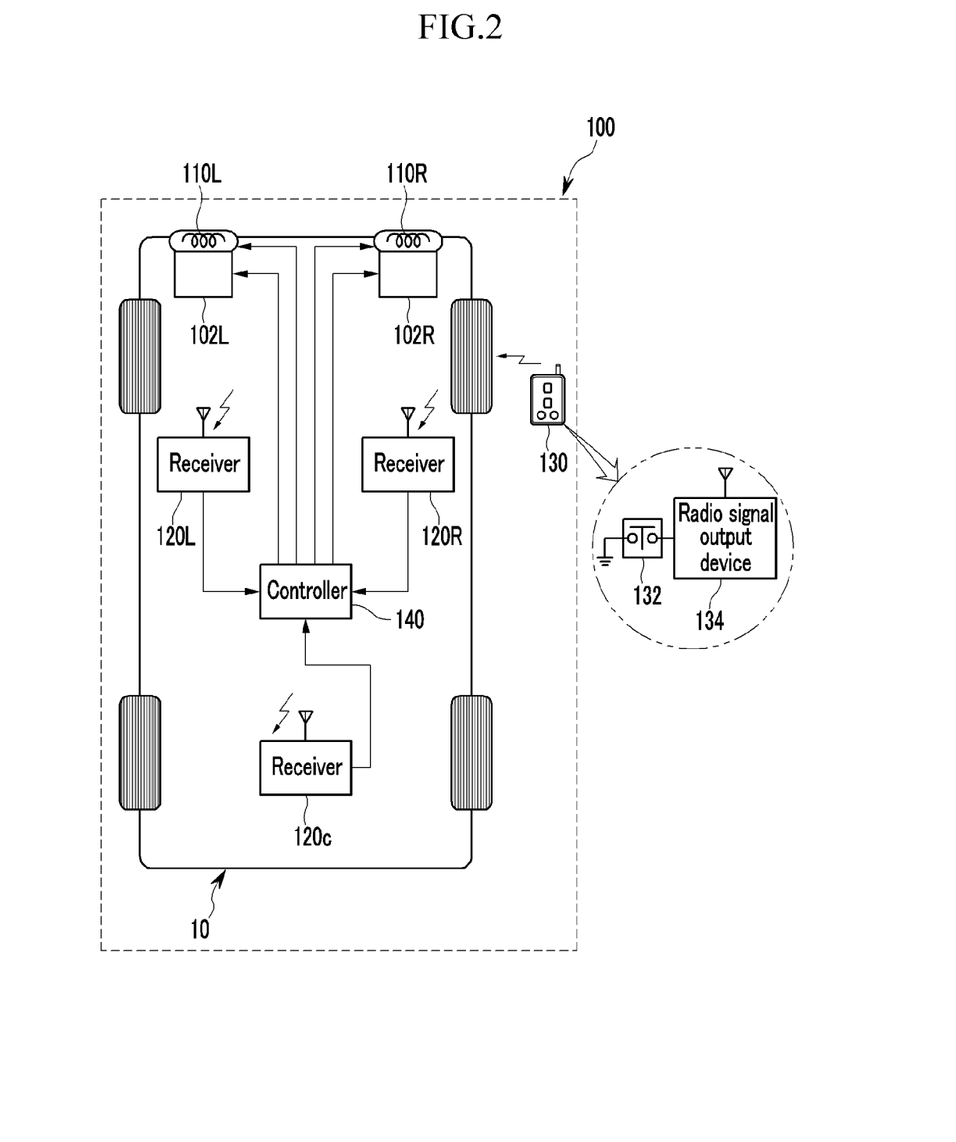
FIG. 2 is a configuration diagram of a headlamp control system for a vehicle according to an embodiment of the present invention.

FIG. 2 is a configuration diagram of a headlamp control system for a vehicle according to an exemplary embodiment of the present invention.

In particular, the headlamp control system for the vehicle according to the exemplary embodiment of the present invention is a headlamp control system for identifying a position of a user (driver) through wireless communication and irradiating light of headlamps to the user's position.

As shown, according to the exemplary embodiment, the headlamp control system 100 for the vehicle includes: headlamps 110L and 110R installed at front left and front right sides of the vehicle and of which an irradiation direction of light and a width and a length of light are adjustable according to driving of actuators 102L and 102R; a plurality of radio signal receivers 120L, 120R, and 120C installed in at least two places of the vehicle as radio signal receivers; a portable radio signal transmitter 130 for transmitting the radio signals received by the plurality of radio signal receivers 120L, 120R, and 120C; and a controller 140 for determining a position of the radio signal transmitter 130 based on the radio signals received by the plurality of radio signal receivers 120L, 120R, and 120C and for controlling the actuators 102L and 102R so as to irradiate light of the headlamps 110L and 110R to the determined position.

According to an exemplary embodiment of the present invention, the headlamps 110L and 110R and the actuators 102L and 102R for driving the headlamps 110L and 110R are the same as a general adaptive headlamp. As such, a detailed description thereof will be omitted.

According to embodiments of the present invention, the radio signal receiver is formed of the radio signal receivers 120L and 120R installed at a left side and a right side of the vehicle 10. The left radio signal receiver 120L and the right radio signal receiver 120R may be generally installed so as to correspond to the adaptive headlamps 110L and 110R installed at the left and right sides of the vehicle 10, respectively. In an exemplary embodiment of the present invention, a horizontally spaced distance between the left radio signal receiver 120L and the right radio signal receiver 120R is as long as possible.

In a case in which the radio signal receiver is installed at only the left side and the right side of the vehicle 10, as described below, it is difficult to accurately discriminate whether the radio signal transmitter 130 moves in a front side or a rear side of the vehicle 10. As such, a central radio signal receiver 120C is further installed at a center location of the vehicle.

According to embodiments of the present invention, the central radio signal receiver 120C is configured and arranged to determine whether the radio signal transmitter 130 moves in the front side or the rear side of the vehicle 10. As such, the central radio signal receiver 120C is not installed in a line parallel to the left and right radio signal receivers 120L and 120R. For example, the left radio signal receiver 120L, the right radio signal receiver 120R, and the central radio signal receiver 120C may be arranged in a triangular structure, such as that illustrated in FIG. 2.

The radio signal receivers 120L, 120R, and 120C are arranged in a triangular structure in order to vary intensities of reception signals received in the respective radio signal receivers 120L, 120R, and 120C by signal attenuation according to a transmission distance of the radio signal when distances between the radio signal receivers 120L, 120R, and 120C and the radio signal transmitter 130 are different. This configuration is based on the assumption that the radio signal receivers 120L, 120R, and 120C have the same configuration.

As shown in the exemplary embodiment of the present invention, three radio signal receivers 120L, 120R, and 120C are provided. However, the present invention is not limited to this number or to the depicted configuration but, rather, and number and configuration of radio signal receivers could be provided. For example, if a position and a movement direction of the radio signal transmitter 130 may be substantially determined by a particular number of radio signal receivers, then technical spirit of the present invention will apply to the particular number of radio signal receivers rather than the depicted configuration of three.

The radio signal receivers (e.g. 120L, 120R, 120C) according to the exemplary embodiment of the present invention may be easily configured through any technology known to those skilled in the art. Thus, a detailed description of the configuration of the radio signal receivers will be omitted.

According to exemplary embodiment of the present invention, a receiver used in a smart key system is used as the radio signal receiver.

According to an exemplary embodiment of the present invention, the radio signal transmitter 130 is a transmitter for transmitting a radio signal. The radio signal may include a unique identification code for controlling the actuators 102L and 102R through the controller 140, and can include a headlamp control switch 132 and a radio signal output device 134. The headlamp control switch 132 may, for example, be a push button switch that may be pressed by a user to turn it on. The radio signal output device 134 may be a radio signal transmitter for outputting a radio signal which includes a unique identification code received by the radio signal receivers 120L, 120R, and 120C and for transmitting the output radio signal when an on-signal is inputted to the headlamp control switch 132.

According to embodiments of the present invention, any radio signal transmitter may be used as the radio signal transmitter 130 as long as the radio signal transmitter 130 may transmit a radio signal including a unique identification code to the radio signal receivers 110L, 110R, and 110C when a user is within a predetermined distance of the vehicle, and may transmit the radio signal when the user operates the switch 132. Thus, for example, the radio signal transmitter 130 may include a smart key or a vehicle remote control key.

According to an exemplary embodiment of the present invention, the controller 140 is configured and arranged for controlling the headlamps 110L and 110R and the actuators 102L and 102R based on the signals received in the radio signal receivers 120L, 120R, and 120C.

Figure 3:
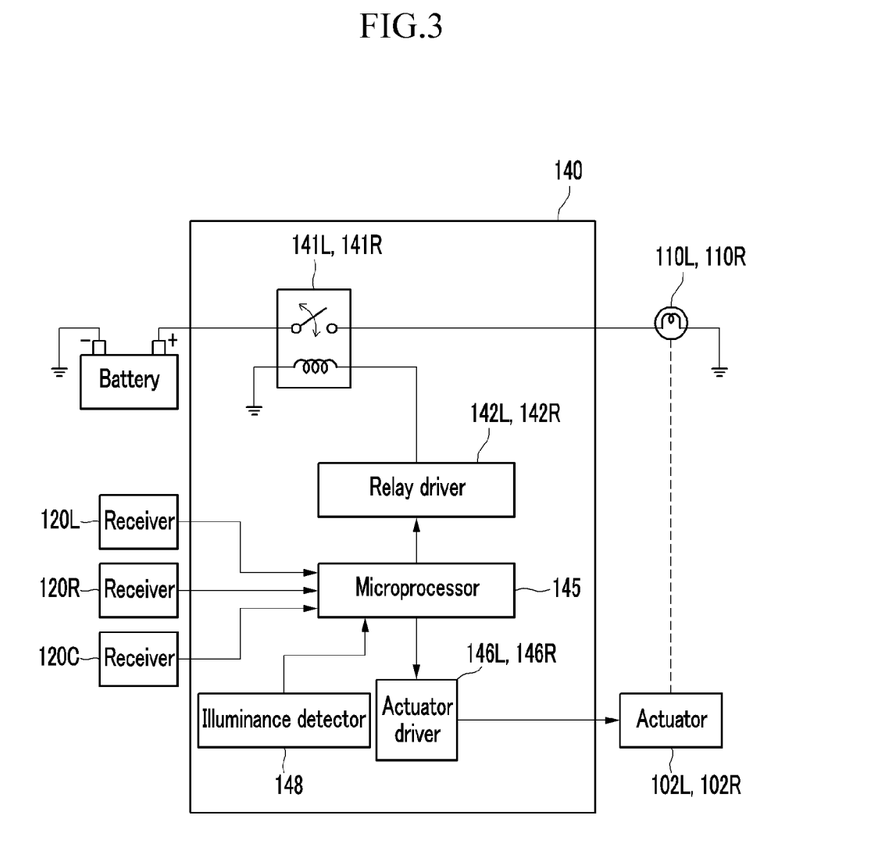
FIG. 3 is a detailed block diagram of a controller of a headlamp control system for a vehicle according to an embodiment of the present invention.

For example, as illustrated in FIG. 3, the controller 140 includes: a microprocessor 145 for controlling a general operation of the controller 140 through signals received by the radio signal receivers 120L, 120R, and 120C; relay drivers 142L and 142R and relays 141L and 141R for applying battery power to the headlamps 110L and 110R under the control of the microprocessor 145; actuator drivers 146L and 146L for controlling driving of the actuators 102L and 102R under the control of the microprocessor 145; and an illuminance detector 148 for receiving signals from the radio signal receivers 120L, 120R, and 120C only when peripheral illuminance (brightness) is equal to or lower than a predetermined illuminance.

In FIG. 3, each of the relays 141L and 141R, the relay drivers 142L and 142R, the actuator drivers 146L and 146L, the adaptive headlamps 110L and 110R, and the actuators 102L and 102R is illustrated as one unit for simplification of the drawing. Accordingly, it should be understood each of the constituent elements illustrated in FIG. 3 may comprise any suitable number.

In an exemplary embodiment of the present invention, the illuminance detector 148 is a cadmium sulfide (CDS) sensor having a resistance value that varies according to a change in peripheral illuminance. Of course, various other types and configurations of illuminance detectors could also be suitably used. In particular, any configuration that may substantially generate output corresponding to a change in peripheral illuminance may be provided according to the present invention.

In an exemplary embodiment of the present invention, the relays 141L and 141R are used due to the large amounts of current applied to the adaptive headlamps 110L and 110R. Accordingly, if an element (for example, a high voltage transistor) may be provided so as to cut off a current applied to the adaptive headlamps 110L and 110R, such an element may be used in place of the relays 141L and 141R.

In an exemplary embodiment of the present invention, the controller 140 is formed as a separate unit. However, the controller 140 may also be formed in combination with a control unit or a body control unit (BCM) of the smart key system.

Hereinafter, an operation of the headlamp control system for the vehicle according to an exemplary embodiment of the present invention will be described in detail with reference to the accompanying drawings.

Figure 4:
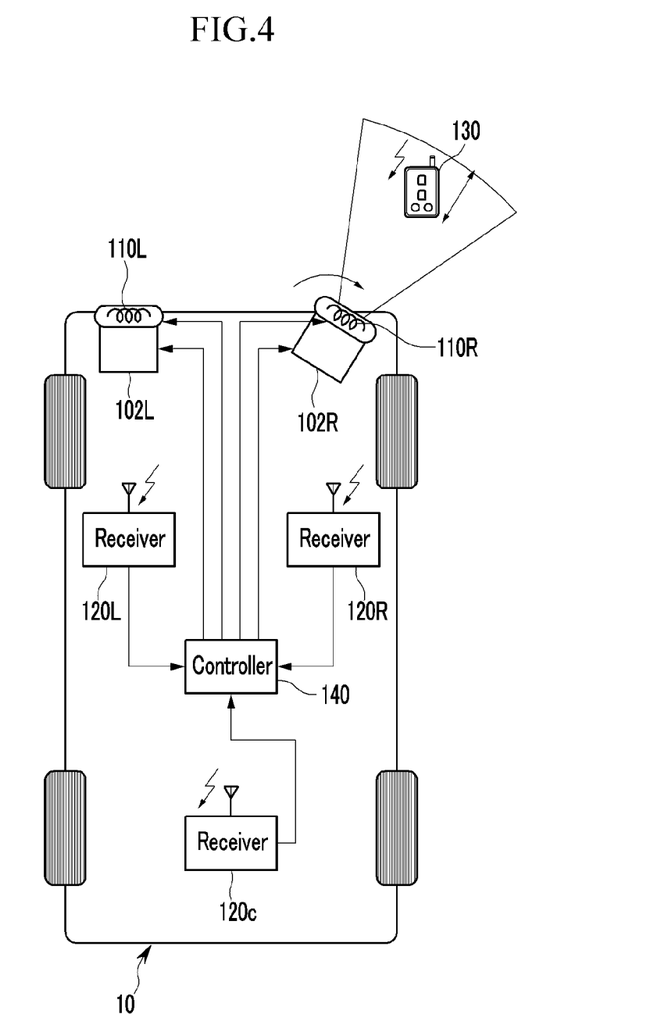
FIGS. 4 to 7 are diagrams for describing an operation of a headlamp control system for a vehicle according to an embodiment of the present invention.

FIG. 4 is a diagram for describing an operation of an exemplary embodiment of the present invention when a user possessing the radio signal transmitter 130 moves in a right-front side of the vehicle.

When the user (or driver) wishes to turn on light of the vehicle headlamp to illuminate his or her position while approaching the vehicle from the right-front side of the vehicle (e.g. in order to get in the vehicle at night), the user presses an operation button of the switch 132 of the radio signal transmitter 130.

When the user approaches the vehicle while pressing the operation button of the switch 132 of the radio signal transmitter 130 as illustrated in FIG. 4, the radio signal output device 134 of the radio signal transmitter 130 transmits a radio signal including a unique identification code towards the outside of the vehicle.

While it is described in the exemplary embodiment of the present to invention that the radio signal output device 134 outputs the radio signal when the user presses the button of the switch 132 of the radio signal transmitter 130, it should be understood that the scope of the present invention is not limited thereto. The technical spirit of the present invention may, for example, be applied even though a different configuration is provided, for example, in a case where the radio signal transmitter 130 transmits the radio signal for a set time when the user operates the button of the switch 132 of the radio signal transmitter 130 once. Further, the technical spirit of the present invention may be applied to a case where wireless communication, such as near field communication (NFC), is automatically established when the user approaches the corresponding vehicle within a predetermined distance by installing a near field communication module. In addition, the object of transmitting of the radio signal by the radio signal transmitter 130 may further be achieved through wireless communication with the smart key as described above.

When the radio signal including the unique identification code is transmitted from the radio signal transmitter 130, the respective radio signal receivers 120L, 120R, and 120C installed in the vehicle 10 receive the radio signal with a signal size that is inversely proportional to a distance to the radio signal transmitter 130. The radio signal receivers 120L, 120R, and 120C then transmit the received radio signal to the microprocessor 145.

Radio signal transmission output of the radio signal transmitter 130 may be output and may be transmitted to a suitable distance (for example, a maximum of 20 m) based on a variety of factors such as usage, costs, design, to and the like. The radio signal transmission output may be easily adjusted by those skilled in the art through the known technology, and thus a detailed description thereof will be omitted.

The microprocessor 145 identifies whether an output signal of the illuminance detector 148 is a signal corresponding to nighttime or a low light condition that requires light of the headlamp. When the output signal of the illuminance detector 148 is a signal corresponding to nighttime or a low light condition, the microprocessor 145 receives the signals transmitted from the respective radio signal receivers 120L, 120R, and 120C and processes the received signals.

However, when the output signal of the illuminance detector 148 is not a signal corresponding to nighttime or a low light condition, the output signal of the illuminance detector 148 is a signal corresponding to daytime or a sufficient light condition that does not require light of the headlamp. As such, the microprocessor 145 does not process the transmitted signals even though the signals are transmitted from the respective radio signal receivers 120L, 120R, and 120C.

That is, the controller 140 according to an exemplary embodiment of the present invention is operated at nighttime or a low light condition and is not operated at a daytime or sufficient light conditions. Accordingly, the following description will be made on an assumption that a nighttime or low light condition is present.

Figure 5:
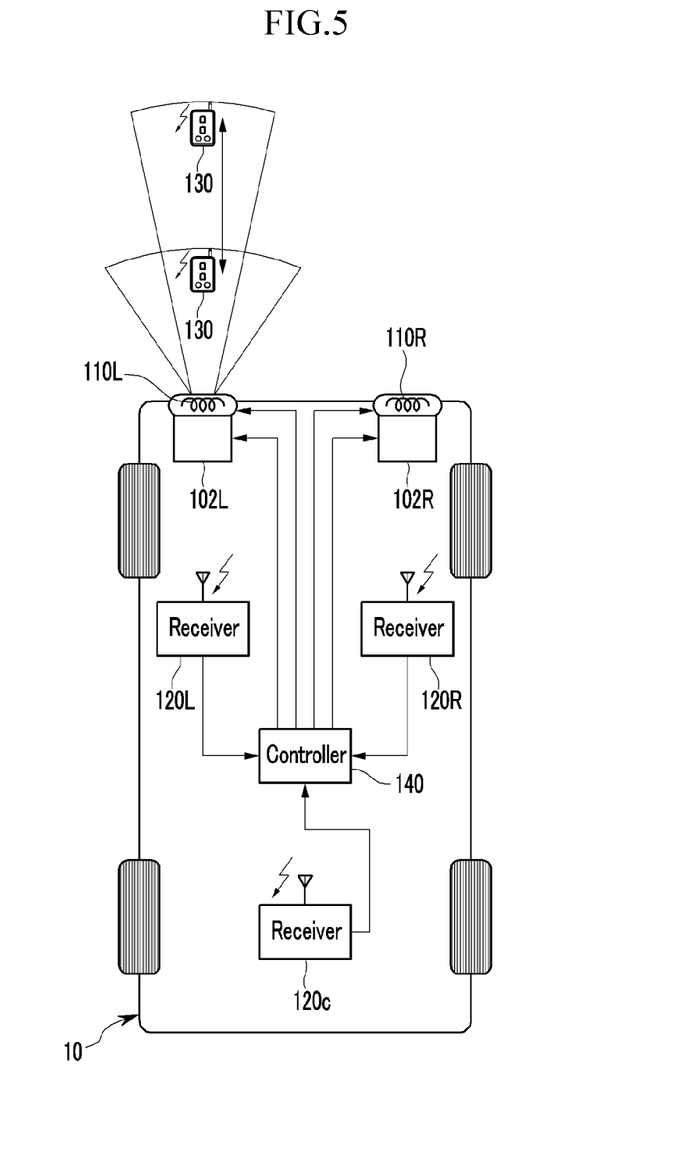

In a case illustrated in FIG. 4, a distance between the radio signal transmitter 130 and the right radio signal receiver 120R is the shortest (i.e. shorter than the distance to the left radio signal receiver 120L or the central radio signal receiver 120C), so that an intensity of the radio signal received in the right radio signal receiver 120R is the largest (i.e. larger than a signal received in the left radio signal receiver 120L or the central radio signal receiver 120C). Further, since the radio signal transmitter 130 moves in the right-front side of the vehicle as illustrated in FIG. 4, a difference between the intensities of the signals received in the respective right radio signal receiver 120R and left radio signal receiver 120L is larger than a case in which the radio signal transmitter 130 moves while being positioned at a direct front side of the vehicle as illustrated in FIG. 5. That is, the more the radio signal transmitter 130 moves in the left or right direction of the vehicle, the larger the difference of the intensities of the signals received in the left and right radio signal receivers 120L and 120R becomes.

Accordingly, in FIG. 4, the microprocessor 145 determines that the user possessing the radio signal transmitter 130 is located in the right-front side of the vehicle.

Based on this determination, the microprocessor 145 turns on the right headlamp 110R by controlling the relay driver 142R and the relay 141R, and controls the actuator 102R so that the light of the right headlamp 110R illuminates the place where the user is located.

While it has been described in the exemplary embodiment that the microprocessor 145 turns on the right headlamp 110R and operates the to actuator 102R only, it is, course within the scope of the present invention that the microprocessor 145 also turns on the left headlamp 110L and operates the actuator 102L together with actuator 102R so as to illuminate the right direction.

As in the case of FIG. 4, when the radio signal transmitter 130 is located in the right-front side of the vehicle, and the radio signal transmitter 130 moves a distance further away from the vehicle, the total intensity of the signals received in the radio signal receivers 120L, 120R, and 120C gradually decreases.

When the total intensity of the signals received in the radio signal receivers 120L, 120R, and 120C is gradually decreased, the microprocessor 145 determines that the user possessing the radio signal transmitter 130 is moving away from the vehicle. As a result, the microprocessor 130 controls the actuator 102R so that light of the right headlamp 110R irradiates further away from the vehicle and, thus, the right headlamp 110R is adjusted to an upper direction to reach the further distance.

In contrast, when the total intensity of the signals received in the radio signal receivers 120L, 120R, and 120C is gradually increased, the microprocessor 145 determines that the user possessing the radio signal transmitter 130 is approaching the vehicle. As a result, the microprocessor 130 controls the actuator 102R so that the light of the right headlamp 110R irradiates a nearby position by adjusting the right headlamp 110R to face a lower direction.

It is considered that the increase of the total intensity of the signals received in the radio signal receivers 120L, 120R, and 120C corresponds to a case in which the user is approaching the vehicle in order to get into the vehicle. Further, it is considered that the gradual decrease of the total intensity of the signals received in the radio signal receivers 120L, 120R, and 120C corresponds to a case in which the user gets out of the vehicle and travels away from the vehicle.

A case in which the radio signal transmitter 130 is located in the right-front side of the vehicle has been described as an example with reference to FIG. 4. However, it will be apparent to those skilled in the art that the general concepts would apply to a case in which the radio signal transmitter 130 is located in the left-front side of the vehicle. As such, a detailed description thereof will be omitted.

FIG. 5 is a diagram describing an operation of an exemplary embodiment of the present invention when the user possessing the radio signal transmitter 130 moves in the front side of the left headlamp 110L of the vehicle.

In this situation, if the user wishes to turn on the light of the vehicle headlamp to illuminate him or her as he or she approaches the vehicle in front of the left headlamp of the vehicle (e.g. in order to get into the vehicle at nighttime or in a low light condition), the user presses an operation button of the switch 132 of the radio signal transmitter 130.

When the user presses the operation button of the switch 132, the radio signal output device 134 of the radio signal transmitter 130 transmits a radio signal including a unique identification code towards the outside of the vehicle.

When the radio signal transmitter 130 transmits the radio signal including the unique identification code, the respective radio signal receivers 120L, 120R, and 120C installed in the vehicle 10 receive the radio signal with a signal size that is inversely proportional to a distance to the radio signal transmitter 130. The radio signal receivers 120L, 120R, and 120C then transmit the received radio signal to the microprocessor 145.

In a case illustrated in FIG. 5, a distance between the radio signal transmitter 130 and the left radio signal receiver 120L is the shortest (i.e. shorter than the distance between the radio signal transmitter 130 and the right radio signal receiver 120R), and thus an intensity of the radio signal received in the left radio signal receiver 120L is the largest (i.e. greater than a signal received in the right radio signal receiver 120R or the central radio signal receiver 120C). Further, since the radio signal transmitter 130 moves in front of the vehicle as illustrated in FIG. 5, a difference between the intensities of the signals received in the right radio signal receiver 120R and left radio signal receiver 120L is relatively smaller than that of the aforementioned case illustrated in FIG. 4. Accordingly, when the difference between the intensities of the signals received in the right radio signal receiver 120R and the left radio signal receiver 120L is not larger than a predetermined intensity, the microprocessor 145 determines that the radio signal transmitter 130 is located in front of the vehicle (generally at a central front location rather than a right or left front location).

Based on the above determination, the microprocessor 145 turns on the to left headlamp 110L by controlling the relay driver 142L and the relay 141L, and controls the actuator 102L so that the light of the left headlamp 110L illuminates the place where the user is located.

In the case of FIG. 5, when the microprocessor 145 determines that the radio signal transmitter 130 is located beyond a set distance based on the intensities of the signals received in the radio signal receivers 120L, 120R, and 120C, the microprocessor 145 controls the actuator 102L so that the light of the left headlamp 110L is directed upward (to illuminate a distance further away). Further, when the microprocessor 145 determines that the radio signal transmitter 130 is located within set distance based on the intensities of the signals received in the radio signal receivers 120L, 120R, and 120C, the microprocessor 145 controls the actuator 102L so that the light of the left headlamp 110L is directed downward (to illuminate a distance nearly).

While it has been described in the exemplary embodiment that the microprocessor 145 turns on the left headlamp 110L and operates the left actuator 102L only, it is, of course, possible to configure the microprocessor 145 so as to also turn on the right headlamp 110R and operate the actuator 102R so as to illuminate the front side of the vehicle.

A case in which the radio signal transmitter 130 is located in front of the left headlamp 110L of the vehicle has been described as an example with reference to FIG. 5. However, it will be apparent to those skilled in the art that this description will similarly apply to a case in which the radio signal transmitter 130 is located in front of the right headlamp 110R of the vehicle. As such, a detailed description thereof will be omitted.

Figure 6:
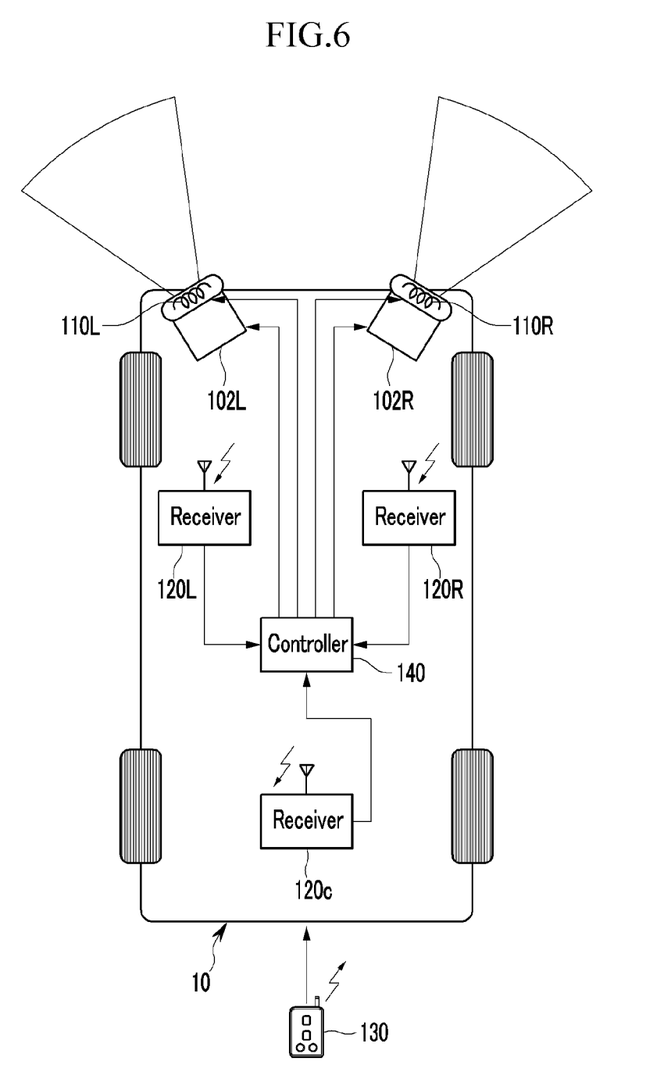

FIG. 6 is a diagram describing an operation of an exemplary embodiment of the present invention when the user possessing the radio signal transmitter 130 moves from the rear side of the vehicle towards the vehicle.

When the user wished to turn on the adaptive headlamp of the vehicle to illuminate a neighboring area of the vehicle while approaching the vehicle from the rear side (e.g. in order to get into the vehicle at nighttime or in a low light condition), the user presses an operation button of the switch 132 on the radio signal transmitter 130.

When the user approaches the vehicle while pressing the operation button of the switch 132, the radio signal output device 134 of the radio signal transmitter 130 transmits the radio signal including a unique identification code toward the outside or the vehicle.

When the radio signal including the unique identification code is transmitted from the radio signal transmitter 130, in a case illustrated in FIG. 6, a distance between the radio signal transmitter 130 and the central radio signal receiver 120C is the shortest (e.g. shorter than the distance to the left radio signal receiver 120L or the right radio signal receiver 120R), so that an intensity of the radio signal received in the central radio signal receiver 120C is the largest (i.e. larger than an intensity received in the left radio signal receiver 120L or the right radio signal receiver 120R). Based on the intensity of the radio signal, the microprocessor 145 determines that the radio signal transmitter 130 approaches the vehicle from the rear side of the vehicle.

Based on this determination, the microprocessor 145 turns on the left and right headlamps 110L and 110R by controlling the relay drivers 142L and 142R and the relays 141L and 141R, and controls the actuators 102L and 102R so that the light of the left and right headlamps 110L and 110R illuminate the side direction of the vehicle in an outermost direction as possible downward or upward as illustrated in FIG. 6.

Figure 7:
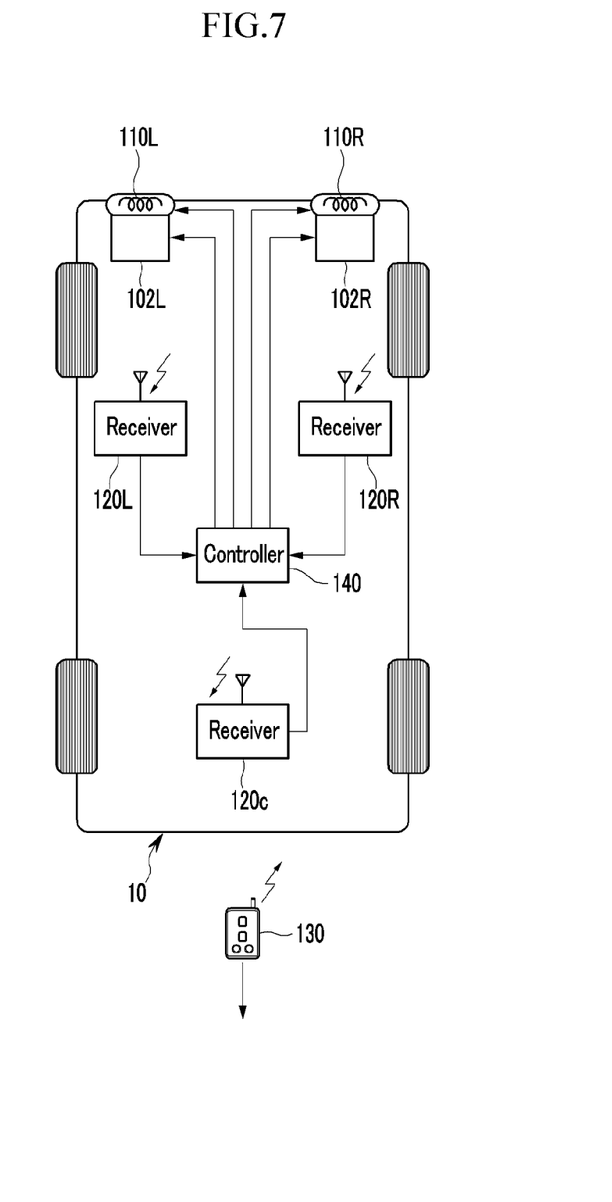

FIG. 7 is a diagram for describing an operation of an exemplary embodiment of the present invention when the user possessing the radio signal transmitter 130 gets out of the vehicle and moves away from the rear side of the vehicle.

When the driver (user) gets out of the vehicle at nighttime or in a low light condition and moves away from the rear side of the vehicle as illustrated in FIG. 7, even though the headlamps 110L and 110R are turned on, the illumination from the headlamps 110L and 110R is generally not helpful to the user. Accordingly, in this case, even though the signal of the radio signal transmitter 130 is received in the radio signal receivers 120L, 120R, and 120C, the microprocessor 145 does not control the lighting of the headlamp.

According to various embodiments, when the intensity of the signal received in the central radio signal receiver 120C is the largest (i.e. larger than that received in the left radio signal receiver 120L or the right radio signal receiver 120R), and a sum of the intensities of the signals received in the three radio signal receivers 120L, 120R, and 120C is gradually decreased lower than a set size, the microprocessor 145 determines that the user has moved away from the rear side of the vehicle as illustrated in FIG. 7. As a result, the microprocessor 145 does not control the lighting of the headlamp.

Accordingly, in the described exemplary embodiments of the present invention, when a user (driver) approaches a vehicle in order to get into the vehicle or moves away from the vehicle such as after getting out of the vehicle, driving of the adaptive headlamp is controlled for a predetermined time so as to illuminate a place where the user is located.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of Symbols>
100L: Left headlamp control system
100R: Right headlamp control system
100C: Central headlamp control system
102L: Left headlamp actuator
102R: Right headlamp actuator 110L: Left headlamp
110R: Right headlamp
120L: Left radio signal receiver
120R: Right radio signal receiver
120C: Central radio signal receiver
130: Radio signal transmitter
140: Controller

What is claimed is:

1. A control system for controlling headlamps of a vehicle, comprising:
one or more actuators in connection with the headlamps and configured and arranged for driving the headlamps upward, downward, left, and right;
a plurality of radio signal receivers disposed at two or more locations of the vehicle and configured and arranged for receiving a radio signal;
a portable radio signal transmitter configured and arranged for transmitting a radio signal receivable in one or more of the plurality of radio signal receivers; and
a controller configured and arranged to determine a position of the radio signal transmitter based on the radio signal received by one or more of the plurality of radio signal receivers, and to control the headlamp and the one or more actuators so that light of the headlamp is irradiated to a position of the radio signal transmitter,
wherein the plurality of radio signal receivers are disposed spaced from each other by a predetermined distance, and the predetermined distance is such that intensities of signals received by each of the plurality of radio signal receivers are different when distances between the radio signal transmitter and each of the plurality of radio signal receivers are different.

2. The control system of claim 1, wherein:
the controller comprises an illuminance detector configured and arranged to detect illuminance of a neighboring area, and when the detected illuminance is equal to or larger than predetermined illuminance, does not process the signal received by one or more of the plurality of radio signal receivers.

3. The control system of claim 1, wherein:
the plurality of radio signal receivers comprises
a left radio signal receiver and a right radio signal receiver disposed at a left side and a right side of the vehicle, respectively, and a central radio signal receiver disposed at a central position of the vehicle, wherein the left, right and central radio signal receivers are disposed in a an isosceles triangular configuration.

4. The control system of claim 3, wherein:
the central radio signal receiver is disposed at a rear side of the vehicle relative to the left and right radio signal receivers.

5. The control system of claim 1, wherein:
the radio signal transmitter is a smart key.

6. The control system of claim 1, wherein:
the controller comprises:
a microprocessor configured and arranged to receive a signal from the radio signal receiver and to control a general operation of the controller;
one or more relay drivers and relays configured and arranged to apply power of a battery of the vehicle to the headlamps under control of the microprocessor; and
one or more actuator drivers configured and arranged to control driving of the one or more actuators under control of the microprocessor.

7. The control system of claim 6, wherein:
the controller is in combination with a control module of a vehicle smart key system configured and arranged for performing vehicle control through wireless communication, and includes authentication of a driver and wireless starting of the vehicle through wireless communication.

8. The control system of claim 6, wherein:
the controller is in combination with a body control module (BCM) configured and arranged for controlling of body electronic equipment, including control of an indication lamp of the vehicle.

9. The control system of claim 6, wherein:
the controller is configured and arranged for
determining that the radio signal transmitter is moving away from the vehicle when a sum of intensities of the radio signals received in the plurality of radio signal receivers gradually decreases, and
for determining that the radio signal transmitter is approaching the vehicle when the sum of intensities of the radio signals received in the plurality of radio signal receivers gradually increases.

10. A method for controlling, by a user, the lighting of one or more headlamps of a vehicle executed by a processor within a controller, the method comprising:
transmitting by a radio signal transmitter a radio signal towards the vehicle;
receiving by a plurality of radio signal receivers disposed at two or more locations of the vehicle the radio signal;
transmitting by one or more of the radio signal receivers the radio signal to a microprocessor;

determining by the microprocessor the location of the radio signal transmitter; and turning on by the microprocessor one or more headlamps to illuminate the location of the radio signal transmitter, wherein the plurality of radio signal receivers are disposed spaced apart from each other by a predetermined distance, and the predetermined distance is such that intensities of signals received by each of the plurality of radio signal receivers are different when distances between the radio signal transmitter and each of the plurality of radio signal receivers are different.

11. A non-transitory computer readable medium containing program instructions executed by a processor, the computer readable medium comprising:

program instructions that receive at a plurality of radio signal receivers disposed at two or more locations of a vehicle a radio signal transmitted by a radio signal transmitter;

program instructions that transmit the radio signal to a microprocessor;

program instructions that determine a location of the radio signal transmitter; and program instructions that turn on one or more headlamps to illuminate the location of the radio signal transmitter, wherein the plurality of radio signal receivers are disposed spaced apart from each other by a predetermined distance, and the predetermined distance is such that intensities of signals received by each of the plurality of radio signal receivers are different when distances between the radio signal transmitter and each of the plurality of radio signal receivers are different.

* * * * *